United States Patent [19]

Lausberg et al.

[11] Patent Number: 5,216,062
[45] Date of Patent: Jun. 1, 1993

[54] THERMOPLASTIC POLYURETHANE MOLDING COMPOSITION

[75] Inventors: Dietrich Lausberg, Ludwigshafen; Rolf Steinberger, Schifferstadt; Gerhard Bittner, Diepholz; Bernd Lukassen, Georgsmarienhuette, all of Fed. Rep. of Germany

[73] Assignee: BASF Aktiengesellschaft, Ludwigshafen, Fed. Rep. of Germany

[21] Appl. No.: 921,391

[22] Filed: Jul. 30, 1992

Related U.S. Application Data

[63] Continuation of Ser. No. 746,076, Aug. 12, 1991, abandoned, which is a continuation of Ser. No. 470,179, Jan. 25, 1990, abandoned.

[30] Foreign Application Priority Data

Feb. 18, 1989 [DE] Fed. Rep. of Germany ....... 3905008

[51] Int. Cl.$^5$ .............................................. C09L 77/00
[52] U.S. Cl. ................................... 524/404; 524/426; 524/447; 524/451; 524/456; 524/491; 524/507; 525/66
[58] Field of Search ............... 525/66; 524/404, 426, 524/447, 451, 491, 507, 456

[56] References Cited

U.S. PATENT DOCUMENTS

| | | | |
|---|---|---|---|
| 3,970,717 | 7/1976 | Müller-Albrecht et al. | 525/66 |
| 3,978,157 | 8/1976 | Bottenbruch et al. | 260/859 R |
| 4,251,642 | 2/1981 | Tan et al. | 525/66 |
| 4,317,890 | 3/1982 | Goyert et al. | 525/66 |
| 4,342,847 | 8/1982 | Goyert et al. | 525/66 |
| 4,659,790 | 4/1987 | Shimozato et al. | 526/87 |
| 4,820,368 | 4/1989 | Markerka et al. | 525/455 |

FOREIGN PATENT DOCUMENTS

| | | |
|---|---|---|
| 0104695 | 4/1984 | European Pat. Off. . |
| 2457387 | 12/1974 | Fed. Rep. of Germany . |
| 2402840 | 8/1975 | Fed. Rep. of Germany . |
| 2549372 | 5/1977 | Fed. Rep. of Germany . |

*Primary Examiner*—Ana L. Carrillo
*Attorney, Agent, or Firm*—Oblon, Spivak, McClelland, Maier & Neustadt

[57] ABSTRACT

A thermoplastic molding composition was composed of

A: 20-90% by weight of a thermoplastic polyurethane,
B: 1-40% by weight of an elastomeric graft copolymer formed from
  $b_1$: 50-90% by weight of a grafting base comprising an elastomeric polymer which has a glass transition temperature of below $-20°$ C. and is based on butadiene or a $C_2$-$C_{10}$-acrylate and, if desired, a crosslinking agent and
  $b_2$: 10-50% by weight of a graft superstratum formed from styrene and acrylonitrile in the ratio of from 85:15 to 60:40 or styrene or methyl methacrylate, and
C: 5-75% by weight of a copolymer formed from
  $c_1$: 55-90% by weight of α-methylstyrene and
  $c_2$: 10-45% by weight of acrylonitrile or methacrylonitrile or a mixture thereof, and
D: up to 50% by weight of a reinforcing filler.

23 Claims, No Drawings

THERMOPLASTIC POLYURETHANE MOLDING COMPOSITION

The present application is a continuation of application Ser. No. 07/746,076 filed Aug. 12, 1991, now abandoned, which is a continuation of application Ser. No. 07/470,179 filed Jan. 25, 1990, now abandoned.

It is known that thermoplastic polyurethanes (TPUs) can be blended with copolymers of styrene, butadiene and acrylonitrile (ABS copolymers).

Blends of ABS and TPU are described in U.S. Pat. Nos. 3,049,505 and 4,179,479. There the ABS polymers always consist of styrene, acrylonitrile and butadiene. The molding compositions obtained show insufficient notched impact strength at low temperatures and incompatibility at high processing temperatures.

We have found that replacing the styrene in copolymers of styrene, acrylonitrile and butadiene by $\alpha$-methylstyrene dramatically improves the compatibility of blends with TPU and leads to molding compositions of excellent low-temperature notched impact strength.

The present invention accordingly provides a thermoplastic molding composition composed of A: 20–90% by weight of a thermoplastic polyurethane A, B: 1–40% by weight of an elastomeric graft copolymer B formed from $b_1$: 50–90% by weight of a grafting base $b_1$ comprising an elastomeric polymer which has a glass transition temperature of below $-20°$ C. and is based on butadiene or a $C_2$–$C_{10}$-acrylate and, if desired, a crosslinking agent and $b_2$: 10–50% by weight of a graft superstratum $b_2$ formed from styrene and acrylonitrile in the ratio of from 85:15 to 60:40 or styrene or methyl methacrylate, and C: 5–75% by weight of a copolymer formed from $c_1$: 55–90% by weight of $\alpha$-methylstyrene ($c_1$) and $c_2$: 10–45% by weight of acrylonitrile or methacrylonitrile ($c_2$) or a mixture thereof, and D: up to 50% by weight of a reinforcing filler D.

In component $b_2$, the $\alpha$-methylstyrene may replace all or some of the styrene. The graft superstratum may be formed in more than one stage.

The present invention also relates to the use of such molding compositions for preparing moldings and to moldings obtained from the molding compositions according to the present invention as essential components.

Component A of the molding compositions according to the invention comprises from 20 to 90, preferably from 30 to 70, % by weight of thermoplastic polyurethane.

The thermoplastic polyurethanes (component A) are known. They are essentially formed from long-chain polyols of molecular weight 400–10,000, poly(preferably di)isocyanates and chain extenders (preferably short-chain polyols having a molecular weight of up to for example 380), in which the equivalent ratio of isocyanates to the Zerewitinoff active H atoms (here called the NCO/OH ratio) is preferably set in the range from 0.95 to 1.10, particularly preferably from 0.98 to 1.08.

Suitable essentially linear polyols having molecular weights of from 400 to 10,000, preferably from 800 to 6,000, for the purposes of the present invention are virtually all those compounds known per se which contain preferably 2 or even—in minor amounts—3 Zerewitinoff active groups (essentially hydroxyl groups) such as polyesters, polylactones, polyethers, polythioethers, polyester amides, polycarbonates, polyacetals, vinyl polymers, eg. polybutadienediols, polyhydroxy compounds which also contain urethane or urea groups, modified or unmodified natural polyols and also those compounds which contain other Zerewitinoff active groups such as amino, carboxyl or thiol groups. These compounds are described, for example, in detail in German Laid-Open Applications DOS 2,302,564, DOS 2,423,764 and DOS 2,549,372 (U.S. Pat. No. 3,963,679) and DOS 2,402,840 (U.S. Pat. No. 3,984,607) and also German Published Application DAS 2,457,387 (U.S. Pat. No. 4,035,213). According to the present invention, preference is given to hydroxyl-containing polyesters formed from glycols and adipic acid, phthalic and/or terephthalic acid and the hydrogenation products thereof, polycaprolactones, polyethylene oxide, polypropylene oxide, polytetrahydrofuran and copolyethers thereof. Particular preference is given to polyesters formed from glycols, adipic acid and polytetrahydrofuran.

Diisocyanates to be used according to the present invention are the aliphatic, cycloaliphatic, aromatic, araliphatic and heterocyclic diisocyanates as described for example in German Laid-Open Applications DOS 2,302,564, DOS 2,423,764, DOS 2,549,372, DOS 2,402,840 and DOS 2,447,387. The diisocyanates which are preferred according to the present invention are unsubstituted or methyl-substituted hexamethylene diisocyanate, isophorone diisocyanate, diphenylmethane diisocyanate and naphthylene 1,5-diisocyanate.

The diisocyanates mentioned may be used together with up to about 15 mol % (based on diisocyanate) of a higher polyisocyanate; the amount of higher polyisocyanate, however, must be limited so as to produce a still fusible or thermoplastic product. A larger amount of higher isocyanate must in general be balanced by using on average less than difunctional hydroxy and amino compounds (or by including monoisocyanates) to prevent excessive chemical crosslinking of the product. Examples of higher isocyanates and monofunctional compounds may likewise be found in the above-cited prior art. Examples of monoamines such as butylamine, dibutylamine, octylamine, stearylamine, N-methylstearylamine, pyrrolidone, piperidine and cyclohexylamine and also monoalcohols such as butanol, 1-ethylhexanol, octanol, dodecanol, amyl alcohols, cyclohexanol and ethylene glycol monomethyl ether. Said monofunctional compounds can also be used as regulators.

Similarly, the chain extenders which are usable according to the present invention are known and described for example in German Laid-Open Applications DOS 2,302,564, DOS 2,423,764, DOS 2,549,372, DOS 2,402,799, DOS 2,402,840 and DOS 2,457,387. They are low molecular weight polyalcohols (preferably glycols), polyamines, hydrazines and hydrazides. It is also possible to use aminoalcohols such as ethanolamine, diethanolamine, N-methyldiethanolamine, triethanolamine and 3-aminopropanol according to the present invention. Preferred chain extenders are ethylene glycol, diethylene glycol, triethylene glycol, 1,4-butanediol, 1,6-hexanediol and hydroquinone di-$\beta$-hydroxyethyl ether. Particular preference is given to hydroquinone di-$\beta$-hydroxyethyl ether, 1,4-butanediol and 1,6-hexanediol.

The polyurethane components may of course be stabilized with the usual hydrolysis and oxidation stabilizers of the prior art.

It is also advisable to add to the graft rubber antioxidants such as 2,6-di-tert-butyl-4-methylphenol, other sterically hindered phenols or other customary antioxidants alone or mixed in an amount of about 0.1–1.5% by weight, based on the total blend. These additions may be incorporated either in the graft rubber or in the polyurethane.

A review of thermoplastic polyurethanes and their properties and applications is given for example in Kunststoffe 68 (1978), 819–825 and in Kunststoff-Handbuch, Volume 7, Polyurethanes, 2nd edition, edited by Dr. G. Oertel (Carl Hanser Verlag, Munich, Vienna 1983).

They can be prepared continuously or batchwise by various processes. The best known ones, which are also used in industry, are the belt process and the extruder process; the belt process, which is preferred, proceeds as follows:

According to GB-A-1 057 018, the polyhydroxy compound and excess organic diisocyanate are combined to prepare a prepolymer which is fed by a metering pump into a mixing head where it is mixed with a certain amount of low molecular weight diol. The reaction mixture obtained is fed onto a conveyor belt and passed through an oven at 70°–130° C. until it solidifies. The reaction product is then comminuted and heat-treated at up to 120° C. for 6–40 hours.

Component B of the molding compositions comprises 5–40, preferably 10–30, % by weight of an elastomeric graft copolymer with butadiene, butadiene/styrene, butadiene/acrylonitrile and acrylic esters as described for example in DE-A-1 694 173 and DE-A-2 348 377. Of these, particularly suitable ones are the ABS polymers described in DE-A-2 035 390, DE-A-2 248 242 and EP-A-22 216, the last being particularly preferred.

Component B) may also be a graft polymer formed from

50–90, preferably 60–80, % by weight of an acrylate rubber having a glass transition temperature of below −20° C., as grafting base, and 10–50, preferably 20–40, % by weight of a copolymerizable ethylenically unsaturated monomer whose homopolymers and copolymers have a transition temperature of more than 35° C., as graft superstratum.

The grafting base comprises acrylate or methacrylate rubbers which may contain up to 40% by weight of further comonomers. The $C_1$–$C_8$-esters of acrylic or methacrylic acid and halogenated derivatives thereof, and also aromatic acrylic esters and mixtures thereof are preferred. Suitable comonomers for the grafting base are acrylonitrile, methacrylonitrile, styrene, α-methylstyrene, acrylamides, methacrylamides and also vinyl $C_1$–$C_6$ alkyl ethers.

The grafting base may be uncrosslinked or partially or completely crosslinked. The crosslinking is produced by copolymerizing preferably 0.02–5% by weight, in particular 0.05–2% by weight, of a crosslinking monomer having more than one double bond. Suitable crosslinking monomers are described for example in DE-A-2 726 256 and EP-A-50 265.

Preferred crosslinking monomers are triallyl cyanurate, triallyl isocyanurate, triacryloylhexahydro-s-triazine and trialkylbenzenes.

If the crosslinking monomers have more than 2 polymerizable double bonds, it is advantageous to limit their amount to not more than 1% by weight, based on the grafting base.

Particularly preferred grafting bases are emulsion polymers have a gel content of more than 60% by weight (as determined in dimethylformamide at 25° C. by the method of M. Hoffman, H. Krömer, R. Kuhn, Polymeranalytik, Georg-Thieme-Verlag, Stuttgart, 1977).

Other suitable grafting bases are acrylate rubbers having a diene core, as described for example in EP-A-50 262.

Suitable graft monomers are in particular styrene, α-methylstyrene, acrylonitrile, methacrylonitrile, methyl methacrylate and mixtures of, in particular mixtures of styrene and acrylonitrile in a weight ration of 90/10 to 50/50.

The graft yield, ie. the ratio of the amount of grafted-on monomer to the amount of graft monomer used, is in general within the range from 20 to 80%.

Rubbers based on acrylates which may be used according to the present invention are described for example in DE-A-2 444 584 and DE-A-2 726 256.

The rubbers on a butadiene basis preferably have a glass transition temperature of below −40° C., in particular below −50° C., which results in good impact strength even at low temperatures.

It is of course the case that it is also possible to use mixtures of the abovementioned types of rubber.

The graft superstratum may be produced in one or more, namely up to 4, stages.

The graft rubbers are prepared in a conventional manner by emulsion polymerization.

Component C of the molding compositions according to the present invention comprises from 5 to 75, preferably from 10 to 60 and in particular from 10 to 40, % by weight of copolymers formed from $c_1$) 55–90, preferably 60–90 and in particular 75–90, % by weight of α-methylstyrene and $c_2$) 10–45, preferably 10–40 and in particular 10–25, % by weight of acrylonitrile and/or methacrylonitrile.

Such products can be prepared for example by the process described in DE-B-1,001,001 and DE-B-1,003,436. Such copolymers are also commercially available. Preferably, the light scattering weight average molecular weight is within the range from 50,000 to 500,000, in particular from 70,000 to 250,000.

The weight ration of B:C is within the range from 1:3 to 3:1, preferably from 1:2 to 2:1, in particular from 1:1.5 to 1.5:1.

Up to 50% of the α-methylstyrene may be replaced by other unsubstituted or substituted styrenes, eg. styrene or p-methylstyrene.

Suitable reinforcing fillers D are for example mineral fillers such as wollastonite, talcum, kaolin or $SiO_2$, preferably glass fibers. Glass fibers find application for example in the form of glass weaves, mats, webs and/or preferably glass filament rovings or cut glass filament made of low-alkali E-glasses having a diameter of 5 to 200 μm and preferably from 6 to 15 μm, and after incorporation the average length is from 0.5 to 1 mm, preferably from 0.1 to 0.5 mm.

Other suitable fillers are for example wollastonite, calcium carbonate, glass spheres, quartz powder, silicon nitride, boron nitride and mixtures thereof.

Of the aforementioned reinforcing fillers, in particular glass fibers have proven advantageous, in particular when high heat distortion resistance or very high stiffness is required.

The proportion of component D is from 0 to 60, preferably from 2 to 50, in particular from 5 to 30, % by weight, based on the total weight of the molding compositions.

Besides components A to D the molding compositions according to the present invention may contain customary additives and processing aids. The amount thereof is in general up to 20, preferably up to 10, % by weight, based on the total weight of components A to D.

Customary additives are for example stabilizers, antioxidants, agents against thermal decomposition and decomposition by ultraviolet light, lubricants, release agents, colorants, such as dyes and pigments, nucleating agents and plasticizers.

Antioxidants and heat stabilizers which may be added to the thermoplastic compositions according to the present invention are for example sterically hindered phenols, hydroquinones, substituted representatives of this group and mixtures thereof, preferably in concentrations of up to 1% by weight, based on the weight of the mixture.

Examples of UV stabilizers are various substituted resorcinols, salicylates, benzotriazoles and benzophenones, which in general are used in amounts of up to 2.0% by weight.

Lubricants and release agents, which in general are added to the thermoplastic composition in amounts of up to 1% by weight, are $C_{12}$–$C_{36}$-fatty acids, fatty alcohols, fatty acid esters and amides and also montan ester waxes.

It is also possible to add organic dyes, such as nigrosine, pigments, eg. titanium dioxide, cadmium sulfide, cadmium sulfide selenide, phthalocyanines, ultramarine blue or carbon black. Nucleating agents, such as talcum, can be used in amounts of up for example 5% by weight, based on components A to D.

The molding compositions according to the present invention can be prepared in a conventional manner in customary mixing apparatus, such as extruders, kneaders and mixers, for example by incorporating components B and C and any D if used into the TPU at 190°–250° C., in particular 210°–240° C.

The molding compositions according to the present invention are easily convertible into moldings which combine good surface characteristics and improved impact strength with high stiffness, in particular at low temperatures. There is no separation of the polymer components either in the molding or in the melt.

EXAMPLES

Thermoplastic molding compositions according to the present invention were prepared using the following starting materials (the stated amounts and ratios are by weight, as in the rest of the text).

A1) Thermoplastic polyurethane based on butanediol adipate (molecular weight 2,000), determined from the OH number: MDI and 1,4-butanediol having an NCO/OH ratio of 1.00 and a Shore D hardness of 59.
A2) same as A1) except NCO/OH=1.04
A3) same as A1) except Shore 64D
A4) same as A1) except Shore 90A
A5) same as A1) except based on a butanediol/ethylene glycol adipate having a butanediol/ethylene glycol ratio of 1:1

All the TPU polymers A1)–A5) additionally contain 1% of diisopropylphenylcarbodiimide, based on the polyester content.

A6) same as A1), except based on p-THF having a molecular weight of 1,000 g/mol, determined from the OH number.
B1) Graft rubber comprising a grafting base (75% by weight) of poly(n-butyl acrylate) which has been reacted with butanediol diacrylate and a graft sheath (25% by weight) of a copolymer of styrene and acrylonitrile (weight ratio 75:25) prepared by emulsion polymerization in a conventional manner (median particle size $d_{50}=450$ nm). The median particle diameter $d_{50}$, as the name implies, is that diameter on either side of which are the diameters of 50% by weight of the particles.
B2) Graft rubber comprising a grafting base of polybutadiene (75%) and a graft sheath (25%) of a copolymer of styrene and acrylonitrile (weight ration 75:25) prepared by emulsion polymerization in a conventional manner ($d_{50}=250$ nm).
B3) Graft rubber as in the case of B2 except with α-methylstyrene instead of styrene.
B4) Graft rubber ($d_{50}=240$ μm) comprising a grafting base of polybutadiene (70%), a first sheath of styrene (10%) and a second sheath of methyl methacrylate, n-butylacrylate and glycidyl methacrylate in a ratio of 89:1, prepared by emulsion polymerization.
C1) Styrene-acrylonitrile copolymer having an S/AN ratio of 65:35 and a viscosity number (VN) of 80, measured in 0.5% strength DMF at 25° C.
C2) same as C1) except for a VN of 60, measured in the same way as in the case of C1).
C3) α-Methylstyrene-acrylonitrile copolymer having an α-MS/AN ratio of 70:30 and a VN of 58, measured in the same way as C1).
D) E-glass fiber, roving or staple, diameter 10 μm.

The molding compositions were produced by intensively mixing the components, melting the mixture in a twin-screw extruder at 230° C. and homogenizing the melt and extruding it into a waterbath. After granulation and drying, the mixture was injection molded at 230° C. (compound temperature) into test specimens which were tested without further aftertreatment. If glass fibers were used, they were added to the homogenized melt in the form of staple or roving.

The results are summarized in Tables 1 and 2 below.

The notched impact strength was determined by IN 53 453, the impact strength by German Standard Specification DIN 53 453, the tensile strength, given in units of N/mm², by German Standard Specification DIN 53 455, and the modulus of elasticity by German Standard Specification DIN 53 457. The heat distortion resistance is reported in terms of the Vicat B temperature, measured by German Standard Specification DIN 53 460.

TABLE 1

| No. | Component A | Component B | Component C | Tensile modulus of elasticity (in N/mm²) | ak −20° C. | ak −30° C. |
|---|---|---|---|---|---|---|
| 1* | 60 A1 | 10 B2 | 30 C2 | 650 | 12 | 5 |
| 2* | 60 A1 | 20 B2 | 30 C2 | 550 | 21 | 6 |
| 3* | 60 A3 | 10 B2 | 30 C2 | 900 | 10 | 4 |
| 4 | 60 A1 | 10 B2 | 30 C3 | 650 | 32 | 11 |
| 5 | 60 A1 | 10 B2 | 30 C3 | 550 | 54 | 19 |
| 6 | 60 A3 | 10 B2 | 30 C3 | 900 | 31 | 9 |
| 7 | 60 A2 | 20 B2 | 20 C3 | 540 | 58 | 23 |
| 8 | 60 A4 | 20 B2 | 20 C3 | 420 | no break | 34 |
| 9 | 60 A5 | 20 B2 | 20 C3 | 590 | 48 | 14 |
| 10 | 60 A6 | 20 B2 | 20 C3 | 500 | no break | 39 |
| 11 | 60 A1 | 20 B1 | 20 C3 | 570 | 36 | 5 |

TABLE 1-continued

| No. | Component A | B | C | Tensile modulus of elasticity (in N/mm²) | ak −20° C. | ak −30° C. |
|-----|-------|-------|-------|------|----|----|
| 12  | 80 A1 | 10 B2 | 10 C3 | 450  | 60 | 35 |
| 13  | 40 A1 | 30 B2 | 30 C3 | 1100 | 28 | 12 |
| 14  | 40 A1 | 20 B4 | 20 C3 | 520  | 42 | 16 |

*Comparative test

TABLE 2

| No. | Component A | B | C | D | Tensile modulus of elasticity | ak −20° C. | ak −30° C. |
|-----|-------|-------|-------|----|------|----|----|
| 1*  | 48 A1 | 16 B2 | 16 C2 | 20 | 3600 | 14 | 5  |
| 2   | 48 A4 | 16 B2 | 16 C3 | 20 | 3200 | 32 | 11 |
| 3*  | 48 A1 | 16 B2 | 16 C3 | 20 | 3600 | 28 | 8  |
| 4   | 48 A3 | 16 B2 | 16 C3 | 20 | 4200 | 18 | 6  |

*Comparative test

We claim:

1. A thermoplastic molding composition composed of:
   A) 20–90% by weight of a thermoplastic polyurethane A having a ratio of isocyanate groups to Zerewitinoff active H atoms of from 0.95 to 1.10,
   B) 1–40% by weight of an elastomeric graft copolymer B formed from:
      $b_1$) 50–90% by weight of a grafting base, $b_1$, comprising an elastomeric polymer which has a glass transition temperature of below −20° C. and is based on butadiene or a $C_2$–$C_{10}$ acrylate, and
      $b_2$) 10–50% by weight of a graft superstratum, $b_2$, formed from styrene, methylmethacrylate, or styrene and acrylonitrile in a ratio of from 85:15 to 60:40, and
   C) 5–75% by weight of copolymer C, consisting essentially of:
      $c_1$) 55–90% by weight of α-methylstyrene, $c_1$, and
      $c_2$) 10–45% by weight of acrylonitrile or methacrylonitrile, $c_2$, or a mixture thereof, and
   D) 2–60% by weight of reinforcing filler D.

2. A molding composition as claimed in claim 1, comprising: 30–70% by weight of polyurethane A, 10–30% by weight of graft copolymer B consisting essentially of 60–80% by weight of grafting base $b_1$, 20–40% by weight of graft superstratum $b_2$ and 10–60% by weight of copolymer C formed from 60–90% by weight of α-methylstryene $c_1$ and 10–40% by weight of (meth)acrylonitrile $c_2$.

3. The molding composition as claimed in claim 2, wherein said molding composition contains 5–30% by weight of a glass fibers D.

4. The molding composition as claimed in claim 1, wherein thermoplastic polyurethane A is formed from polyols having a molecular weight from 400 to 10,000, polyisocyanates, and chain extenders having a molecular weight up to 380.

5. The molding composition as claimed in claim 4, wherein said polyisocyanates are selected from the group consisting of hexamethylene diisocyanate, methyl-substituted hexamethylene diisocyanate, isophorone diisocyanate, diphenylmethane diisocyanate, and naphthalene 1,5-diisocyanate.

6. The molding composition as claimed in claim 5, wherein the polyisocyanates further comprise up to 15 mol % (based on diisocyanates) of one or more higher isocyanates, balanced by addition of one or more monofunctional compounds selected from the group consisting of butylamine, dibutylamine, octylamine, stearylamine, N-methylstearylamine, pyrrolidone, piperidine, cyclohexylamine, butanol, 1-ethylhexanol, octanol, dodecanol, amyl alcohols, cyclohexanol and ethylene glycol monomethyl ether, such that said molding composition is still fusible or thermoplastic.

7. The molding composition as claimed in claim 1, wherein the grafting base $b_1$ is based on a $C_2$–$C_{10}$ arcylate, and further comprises up to 40% by weight of further comonomers, selected from the group consisting of acrylonitrile, methacrylonitrile, styrene, α-methylstyrene, acrylamides, methacrylamides and vinyl $C_1$–$C_6$ alkyl ethers.

8. The molding composition as claimed in claim 1, wherein the grafting base $b_1$ is based on butadiene, and has a glass transition temperature of below −40° C.

9. The molding composition as claimed in claim 1, wherein grafting base $b_1$ has a gel content of not more than 60%.

10. The molding composition as claimed in claim 1, wherein the styrene in graft superstratum $b_2$ is replaced with α-methylstyrene.

11. The molding composition as claimed in claim 2, wherein the styrene in graft superstratum $b_2$ is replaced by α-methylstyrene.

12. The molding composition as claimed in claim 1, wherein copolymer C has a light scattering weight average molecular weight of from 50,000 to 500,000.

13. The molding composition as claimed in claim 12, wherein copolymer C has a light scattering weight average molecular weight of from 70,000 to 250,000.

14. The molding composition of claim 1, wherein reinforcing filler D is one or more of the fillers selected from the group consisting of wollastonite, talcum, kaolin, glass fibers, silica, calcium carbonate, glass spheres, silicon nitride and boron nitride.

15. The molding composition of claim 14, wherein reinforcing filler D is glass fibers.

16. The molding composition of claim 15, wherein said glass fibers D are low-alkali E-glasses having a diameter of 5 to 200 μm, and after incorporation, an average length of from 0.05 to 1 mm.

17. The molding composition of claim 15, wherein the glass fibers are in the form of cut glass filament made of low-alkali E-glasses having a diameter of from 6 to 15 μm, and after incorporation, the average length is from 0.1 to 0.5 mm.

18. The molding composition as claimed in claim 1, which further comprises one or more additives selected from the group consisting of heat stabilizers, ultraviolet light stabilizers, antioxidants, lubricants, release agents, colorants, plasticizers, and nucleating agents, in an amount up to 20% by weight, based on the total weight of components A, B, C and D.

19. The molding composition as claimed in claim 2, which further comprises one or more additives selected from the group consisting of heat stabilizers, ultraviolet light stabilizers, antioxidants, lubricants, release agents, colorants, plasticizers, and nucleating agents, in an amount up to 10% by weight, based on the total weight of components A, B, C and D.

20. The molding composition as claimed in claim 2, wherein copolymer C is present in an amount of from 10 to 40% by weight, and consists essentially of 75–90% by weight of α-methylstyrene, $c_1$, and 10-25% by weight of (meth)acrylonitrile, $C_2$.

21. The molding composition of claim 1, wherein said copolymer C consists essentially of:
   $c_1$) 60-90% by weight of α-methylstyrene, $c_1$, and
   $c_2$) 10-40% by weight of methylacrylonitrile, $c_2$, and is present in an amount of from 10 to 60% by weight of the composition.

22. The molding composition of claim 21, wherein said copolymer C is present in an amount of from 10 to 40% by weight of the composition.

23. The molding composition of claim 14, wherein said silica is quartz powder.

* * * * *